United States Patent [19]
Vali et al.

[11] 3,886,480
[45] May 27, 1975

[54] METHOD AND APPARATUS FOR OBTAINING VERY HIGH ENERGY LASER PULSES: PHOTON CYCLOTRON

[76] Inventors: Victor Vali, 752 North 900 West Apt., Salt Lake City, Utah 84116; Reuben S. Krogstad, 2632 S.W. 120th, Seattle, Wash. 98168; Raymond Goldstein, 1401 N. Los Robles, Pasadena, Calif. 91104

[22] Filed: Apr. 12, 1973

[21] Appl. No.: 350,408

[52] U.S. Cl. ............................................. 331/94.5 C
[51] Int. Cl. ............................................... H01s 3/08
[58] Field of Search ................................... 331/94.5

[56] References Cited
UNITED STATES PATENTS
3,398,376   8/1968   Hirshfield .......................... 331/94.5

*Primary Examiner*—William L. Sikes

[57] ABSTRACT

Apparatus is arranged in selected embodiments of several combinations, each sometimes being referred to as a system, and each embodiment establishing a large enclosable chamber containing a laser energy reacting medium through which a laser beam is created. When laser energy pulses of such a beam are created, they are guided in a continuous path using reflectors in this chamber, and they receive supplemental energy units from multiple spaced laser pumps.

Each laser pump is effective in respect to its own inverted population laser energy source, and each laser pump is triggered by an overall excitation control system. The laser beam is thereby supplemented to a higher level at each laser pump. Yet at all times the laser energy reacting medium remains at a level below super radiance.

A working unit or working pulse of a laser beam is allowed to escape from each large enclosable chamber through an escape exit only when a preselected very high energy level is reached. The escape exit of this chamber may be designed to be destroyed by the exiting high level pulse energy of the laser beam. Also an escape exit may be opened upon the operation of a piezoelectric decoupler.

29 Claims, 18 Drawing Figures

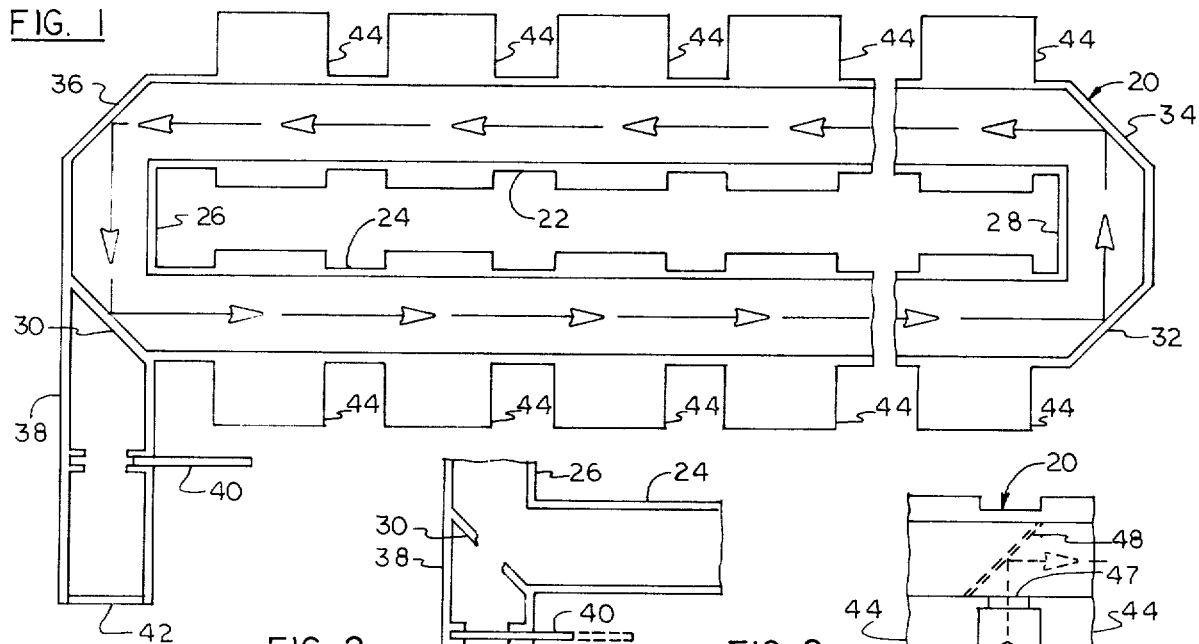

METHOD AND APPARATUS FOR OBTAINING VERY HIGH ENERGY LASER PULSES: PHOTON CYCLOTRON

BACKGROUND OF THE INVENTION

As indicated in many literature sources such as "A Guide to The Laser" edited by David Fishlock and published by Macdonald and Company Ltd. 1967, the generation of laser light, also referred to as the coherent light, has been undertaken in many ways, such as by using solid-state lasers, gas lasers, liquid lasers, and semiconductor lasers. Also laser apparatus has been operated for many purposes, such as holography by laser light, eye operations using a laser, telecommunications using lasers, controls initiated by lasers, measurements by lasers and heating by lasers.

For example, in utilizing lasers with other apparatus to create the basis for observing and/or making measurements U.S. Pat. No. 3,398,287 is referred to, wherein Ruben S. Krogstad, Victor Vali and Walter Vali illustrate and describe their radiation sensitive geophysical strain measuring apparatus. It is very effectively used to indicate the occurrence of as well as the magnitude of relative movement between two portions of the earth's crust. The two portions observed were located a great distance apart for the laser provided a substantially monochromatic beam of radiation which performed throughout a great chherence distance.

Throughout all the known prior research and developments of apparatus to utilize laser energy, there remained limitations in the level of energy to be reached in creating a laser pulse. For example, the energy in the laser pulse was limited by the number of molecules, atoms or color centers available. Also the energy in the laser pulse was limited by the power density a solid or fluid laser may tolerate. Yet laser pulse energy at higher levels in laser beams, if obtainable, was considered for possible applications.

Therefore, this apparatus and the method illustrated and described herein is now provided to increase the energy of laser pulses in a laser beam to very high levels. When so raised, a working pulse of a laser beam is found to be useful for many applications, inclusive of incorporation in other apparatus and in practicing other more comprehensive overall methods.

SUMMARY OF THE INVENTION

Apparatus and methods are provided to increase the energy of laser pulses in a laser beam to very high levels going well beyond the past established limits attributable to the limitation of the number of molecules, atoms, or color centers available, and to the limitation of the power density tolerated by solid or fluid lasers. The apparatus and method both center on providing a large enclosable chamber and creating therein a continuous path to be repeatedly traveled over by pulses of a laser beam, as each pulse is supplemented with energy from many laser pumps, sequentially operated, until a predetermined level of energy is reached, so a working pulse of a laser beam is allowed to escape from the continuous path and from the large enclosable chamber.

The apparatus is available in many embodiments and the components thereof are derived from many selectable conventional units. Also new selectable units are provided, such as the continuously replaceable reflecting materials utilized in creating the continuous path defined by the sealable large enclosable chamber. Moreover, escape exits are designed to reflect pulses of a laser beam until a predetermined very high energy level is reached and then they are to be destroyed allowing the escape of a working pulse of a laser beam.

Throughout the practice of the method, in its various modifications, after the laser beam has been created the increases in the energy levels of the pulses of the laser beam are kept under control so super radiance levels of the laser energy reacting medium are never reached. Only, when starting is the laser energy reacting medium sometimes allowed to become super radiant in the direction of motion of the intended laser beam, generally referred to as the forward direction. But when starting is assured, the laser energy reacting medium is kept below a super radiant level. Moreover, in reaching escape energy levels of the pulses of the laser beams, the increments of the energy supplied at each inverted population laser energy source, are controlled in such an effective way, that the shortened description of the apparatus in any of its embodiments is denoted by the words, photon cyclotron.

DRAWINGS OF PREFERRED EMBODIMENTS

The drawings illustrate several embodiments selected from many potential embodiments, wherein:

FIG. 1 is a schematic view, using directional arrows and with portions removed for illustrative purposes, of an embodiment of the apparatus to produce high level energy pulses of laser beams, wherein a large enclosable chamber is constructed of two long parallel pipes and two shorter parallel pipes arranged at right angles to the longer pipes, and mirrors are used to reflect the pulses of the laser beam which is created in a fluid medium such as carbon dioxide, xenon, neon, helium-neon mixture, etc., using multiple laser pumps, and one mirror serves as the escape exit, being capable of destruction when a preselected pulse energy level of the laser beam is reached, and a mechanical valve is thereafter closed quickly to keep the fluid as pure as possible in the chamber by keeping the surrounding atmospheric fluids out;

FIG. 2 is a partial schematic view of portions of the large enclosable chamber, illustrated in FIG. 1, showing the destroyed mirror and the closed mechanical valve;

FIG. 2A is a partial schematic view of portions of the large enclosure chamber, illustrated in FIG. 1, showing how an outside starting laser may be used and its beam is directed through a window into the path of the chamber using a mirror which thereafter is immediately destroyed by using electronic means;

Figure 6:
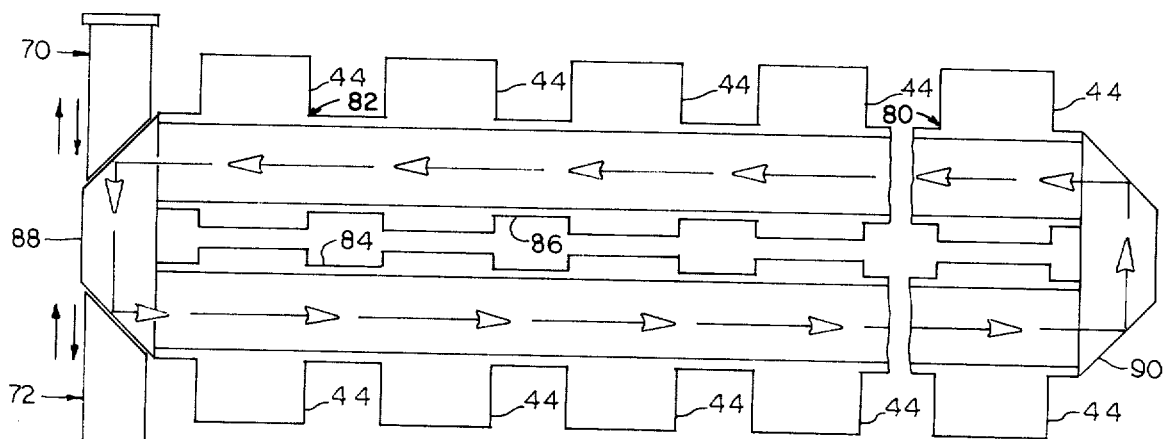
Figure 7:
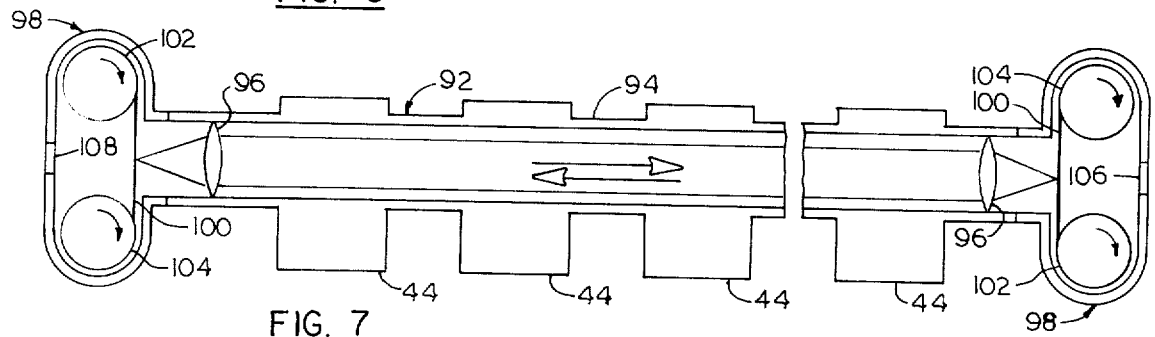
Figures 8, 9, 10, 11:
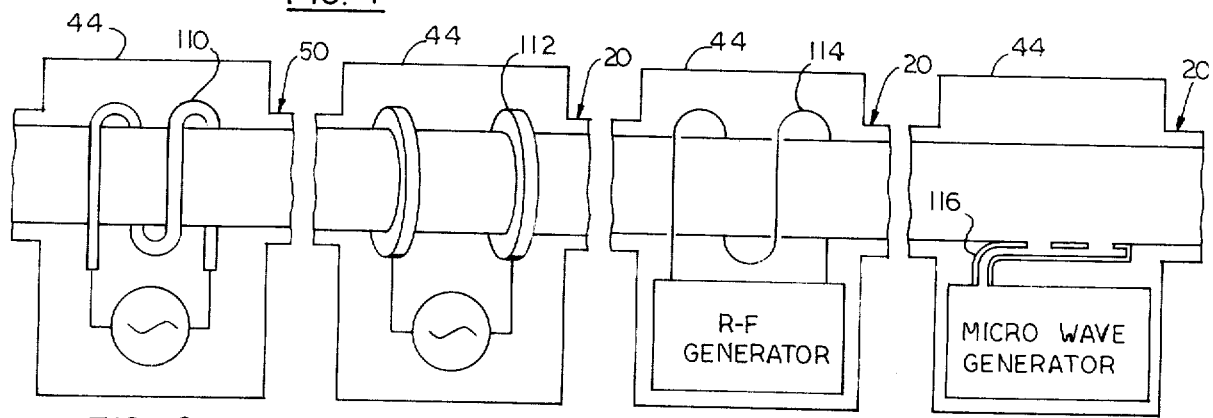
Figures 12, 13, 14, 15, 16, 17:
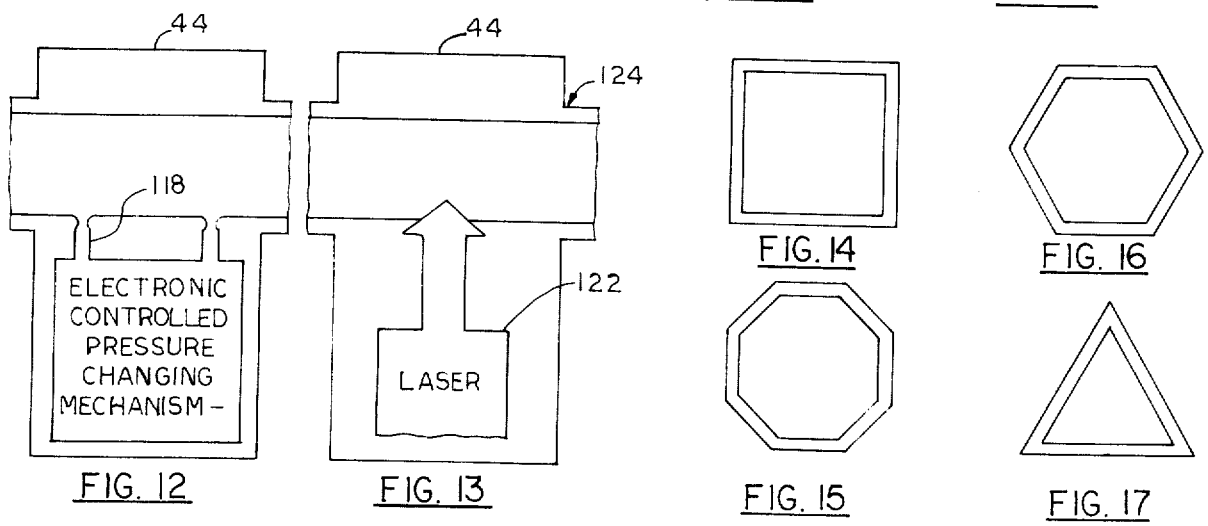

FIG. 3 is a schematic view, with portions removed for illustrative purposes, of another embodiment of the apparatus to produce high level energy pulses of laser beams using dye lasers, and eliminating all optical interfaces while relying on total internal reflection, as indicated by the arrows, and utilizing piezoelectric decouplers both to introduce an initial energy pulse into the apparatus and to extract the amplified pulses of the laser beam from the apparatus;

FIGS. 4 and 5 are both partial schematic views of portions of the large enclosable chamber, illustrated in FIG. 3, showing in FIG. 4 the exit piezoelectric decoupler uncoupled so no pulse of a light beam will escape, and in FIG. 5, the same exit piezoelectric decoupler coupled so a working pulse of a light beam will escape;

FIG. 6 is a schematic view, with portions removed for illustrative purposes, of another embodiment of the apparatus to produce high level energy pulses of laser beams, wherein long pipes are connected at their ends by glass prisms which are effective in changing the direction of the laser beam, as indicated by the arrows, by total internal reflection at the respective corners of this overall rectangular arrangement of this large enclosable chamber, and the energy initiating pulse is supplied through the operation of a piezoelectric decoupler, and a working unit of an amplified pulse of the laser beam is extracted from the system by the operation of another piezoelectric decoupler; and FIG. 7 is a schematic view, with portions removed for illustrative purposes, of another embodiment of the apparatus to produce high level energy pulses of laser beams, wherein a large enclosable pipe chamber terminates in end compartments, having two lens and two mirror reflectors, arranged in a subassembly, is utilized to create the continuous path followed by the laser beam which is created in a gas such as carbon dioxide, xenon, etc., and pumped across and back through the pipe chamber, the respective mirror reflectors being composed of continuously moved thin dielectric or metallic strips, handled by roll mechanisms, the movements being necessitated by destruction of the reflective properties of the strips upon reflecting each pulse of the laser beam, and then subsequently, upon the passing of the end of the reflecting strip, the working unit of the laser beam escapes through a window in an end compartment;

FIGS. 8 through 13, in partial schematic views, with portions removed, indicate various types of pumps which in reference to each selected type are utilized, around a respective large enclosable chamber, a flash tube pump being shown in FIG. 8, a gas discharge pump being illustrated in FIG. 9, a radio frequency discharge pump being shown in FIG. 10, a microwave pump being illustrated in FIG. 11, an electronically controlled pressure changing mechanism or gas dynamic pump as shown in FIG. 12; and an independent laser being shown as a pumping laser in FIG. 13;

FIGS. 14 through 17 show how respective large enclosable chambers may be arranged in different geometric patterns.

DESCRIPTION OF THE ILLUSTRATED EMBODIMENTS

Introduction to All Embodiments

The term laser derived from light amplification by stimulated emission of radiation, as used in describing the method and apparatus of this invention maintains its conventional meaning. However, instead of being concerned with the initial creation of a laser pulse by using many known methods and apparatus, the method and apparatus of this invention is directed to increasing the energy of starting laser pulses from any source to very high levels.

Previously, the energy levels obtainable in laser pulses were limited by the number of molecules, or atoms, or color centers available and/or the power density to be tolerated by solid or liquid lasers, often called dye lasers, all in reference to the initial creation of a laser pulse. Now using this method and apparatus, in its various embodiments, the former limitations are bypassed as a laser pulse from any source is entered into or created within a large polygon enclosure containing a lasing medium. As the laser beam is directed throughout this large polygon enclosure, side by side, inverted population lasing sections of the overall volume are timely and repeatedly excited, subject to the limitation of keeping the lasing medium below super radiance. The excitation of the inverted population sections, also referred to generally as pumping, it timed so the inverted population is at a maximum when the related laser pulse returns to the particular section of the lasing volume being pumped. The energy of the inverted population in each section is then added to the laser pulse, after each traversal around the interior of the polygon enclosure. After continued pumping very high energy level laser pulses are obtained and when they reach a working unit they are released from the enclosure which is often a polygon enclosure. The terms photon cyclotron are considered descriptive of the respective embodiments of many types of apparatus or so called systems used in obtaining these very high energy laser pulses.

Gas Photon Cyclotron Having a Destructable Mirror at a Corner and a Mechanical Closing Valve In FIG. 1 the enclosed polygon 20 is composed of two long pipes 22, 24 spaced apart and parallel, the broken lines indicating this extensive overall length. These long pipes 22, 24 are connected by comparatively much shorter pipes 26, 28 which are transversely arranged and equipped with angular corner mirror structures 30, 32, 34, 36. At the corner mirror structure 30, there is a pipe extension 38 having a mechanical valve assembly 40 positioned well beyond short pipe 26, and having a destroyable end closure structure 42 at its terminus. In comparison to all the other mirror structures 32, 34 and 36, angular corner mirror structure 30 is made intentionally weaker to serve, upon its destruction, as the exit for a working pulse of a very high energy laser beam which continues on to destroy end closure structure 42 and thereafter be utilized for a selected purpose.

In order to raise the energy of an admitted or created, starting laser pulse, pumps 44, i.e., inverted population sections, are arranged adjacent one another throughout the length of the long pipes 22, 24. Then their operations are timed to increase the energy of a laser pulse as the laser beam is being directed, as indicated by the directional arrows. In this embodiment the directional path is long in reference to a return trip or cycle to a pumping location 44. The latter is also referred to as a section of the lasing medium wherein there is an inverted population which receives a time excitation.

As illustrated in FIG. 2, when a laser pulse reaches a designed energy level, the angular corner mirror structure 30 is destroyed and the end closure 42 is destroyed and the working unit of a laser beam escapes. The mechanical valve 40 immediately thereafter closes to protect the lasing medium which in this embodiment is preferably carbon dioxide, from the atmospheric fluids.

Starting This and Other Photon Cyclotrons

The starting of this apparatus, i.e., system, or i.e., photon cyclotron may be by a conventional method of amplifiers in series with an oscillator or similar purpose accessories, or as illustrated in FIG. 2a, a starting laser 46 may be used, to introduce an initial pulse. It enters through window 47 into the enclosed polygon 20 where it is redirected along the interior path of the photon cyclotron by using the mirror 48. After the pulse is redirected, an electrical energy pulse of high current is used to destroy mirror 48. It is destroyed during the round trip of the laser light beam which takes more than 1 microsecond in this embodiment.

Another way to initiate a laser light pulse capable of traveling around the photon cyclotron is to let the system, only at this starting time, become super radiant only in the direction of the propagation of the pulse, generally referred to as in the forward direction. During this limited start up time the gain in this forward direction is greater than one in the expression:

$$g = e^{N \sigma L} > 1$$

where L may be made as large as desired, being the length of many round trips through the enclosed polygon 20.

Dye Photon Cyclotron Having Piezoelectric Decouplers

In FIG. 3, a general arrangement of an enclosed polygon 50 is shown which is similar to the arrangement illustrated in FIG. 1. There are the long pipes 52, 54 and short pipes 56, 58 and the polygon is further shaped by the corner structures 60, 62, 64, 66 to establish a total internal reflection path of the laser beam throughout the liquid lasing medium, the overall arrangement being broadly referred to as a dye laser photon cyclotron.

Again pumps 44 are arranged throughout the lengths of the long pipes 52, 54, identifying the inverted population sections of the lasing medium, which is any one of those liquid mediums currently being used in dye lasers. These pumps 44 become effective in a timed sequence using conventional excitation and timing equipment, as subsequently indicated in FIGS. 8 through 12.

A piezoelectric decoupler subassembly 70 is utilized to introduce an initial pulse, from a conventional source, into the system, and a piezoelectric decoupler subassembly 72 is utilized in effect to clear or to open an exit for the working unit of the very high energy pulse of the laser beam following the operation of this embodiment of the photon cyclotron. The operation of the piezoelectric decoupler 72 subassembly is diagrammatically illustrated in FIGS. 4 and 5. In FIG. 4, the laser beam is continuing its reflective path, as indicated by the direction arrows in FIGS. 3 and 4, within the polygon enclosure 50. No voltage is being supplied to the piezoelectric crystal portions 74 of the decoupler subassembly 72 as switch 76 remains open in circuit 78, shown in part. As a consequence, the open gap, denoted at A, remains in excess of a wave length, and the decoupler subassembly 72 remains uncoupled. However, when the anticipated high level energy pulse is created, switch 76 is closed and voltage is applied to the piezoelectric crystal portions 74. Then their resultant movement substantially closes the gap, denoted at B, to well under a wave length, and the decoupler subassembly 72 is coupled. As a consequence, a working unit of the laser beam is released for its intended purpose. Also crystals performing these coupling and decoupling functions may be described as piezomagnetic crystals.

Gas Photon Cyclotron Having Glass Prisms

In FIG. 6, a gas photon cyclotron 80 is illustrated having a polygon 82 constructed of spaced and parallel long pipes 84, 86 joined at their ends by glass prisms 88, 90 and containing a gas lasing medium such as carbon dioxide, xenon, neon, heliumneon, etc. The path of the laser beam within polygon 82 is shown with arrows, and the changes in direction are accomplished through total internal reflection.

Pumps 44 are spaced throughout the long pipes 84, 86. Each pump is at a section of the lasing medium which is an inverted population location. The pumps 44 are excited and timed by conventional means indicated in part in FIGS. 8 through 12. Preferably, as discussed in conjunction with the dye laser photon cyclotron having polygon 50, piezoelectric decouplers 70, 72 are likewise utilized to respectively introduce a starting pulse and subsequently permit the exit of a working pulse of the high energy level laser beam for its intended assignment.

Gas Photon Cyclotron Having a Long Pipe Equipped With Paired Lens and Mirror Reflectors, the Latter Being Moved Into a Reflecting Position, Destroyed Upon Reflection, Cleared Away, and Replaced Through Operation of a Moving Strip of Reflection Material In FIG. 7, a gas photon cyclotron 92 is shown utilizing one long pipe 94 instead of a polygon. At each end of pipe 94 is a lens 96. Within the pipe 94 there is a gas lasing medium, such as carbon dioxide, xenon, etc. Beyond each lens 96, is powered assembly 98 to move reflecting materials 100 to serve as one time mirrors and then to move them on to be replaced by new reflecting materials 100. Rollers 102 holds and dispenses new reflecting materials 100. After its destruction in part, where a laser beam has been reflected, it is collected on rollers 104. After the material 100 from either roller 102 at either end is depleted, the working unit of the high level energy laser beam exits to accomplish its intended purpose through an exit window 106 or 108.

As indicated in conjunction with the descriptions of the other photon cyclotrons, pumps 44 are spaced throughout the long pipe 94. Their operation is undertaken through the correct timing of conventional excitation equipment. The respective inverted population sections of the lasing medium timely add the increased energy to the laser beam, until the working unit exits.

Various Pumps to be Used in Selected Embodiments of the Photon Cyclotrons

In FIGS. 8 through 12, various pumps are schematically indicated, having been previously denoted in general by numeral 44. The conventional flash tube pump 110 in FIG. 8 is used with dye laser and solid state laser photon cyclotrons. With respect to photon cyclotrons using a gas lasing medium, all of the following pumps 44 are selectively used: the gas discharge pump 112 of FIG. 9; the radio frequency discharge pump 114 of FIG. 10; the microwave-wave guide pump 116 of FIG. 11; the electronic controlled gas dynamic or pressure changing mechanism pump 118 of FIG. 12; and other conventional pumps, not shown.

Outside Laser Operated as a Pumping Laser

In the various embodiments of these photon cyclotrons, conventional equipment and methods will be used and undertaken to excite the lasing medium in the various section locations, within the long pipe or pipes. In addition an outside laser 122 will be utilized as a pumping laser, as indicated in FIG. 13.

Various Configurations of the Enclosable Chamber Which Contains the Lasing Medium In FIGS. 1, 3 and 6, the enclosable chamber configuration comprised the two long pipes and the two short pipes, the latter formed to aid in redirecting the laser beam. In FIG. 7, the enclosable chamber was essentially a single pipe. As indicated in FIGS. 14, 15, 16 and 17, other enclosable chamber configurations may be used, such as the square of FIG. 14, the octagon of FIG. 15, the hexagon of FIG. 16 and the triangle of FIG. 17.

Some Design Criteria in Relation to Specific Embodiments

In performing this method and in designing apparatus useful in practicing this method, the objective is to provide several separate side by side inverted population volumes and with respect to each respective inverted population volume it is used repeatedly on a timed sequence as its pulse returns. Thereafter, the limit of the energy created in a laser pulse is generally determined by the reflection properties of the mirrors.

During operation of the photon cyclotron, once started, the laser medium stays below radiance throughout all of the comparatively small sections of each inverted population. This means the gain in each section is less than 1, and the equation is:

$$g = e^{N \sigma L} < 1$$

where N is the inverted population density, o is the cross section for stimulated emission and L is the length, or the largest dimension, of the individual pumped section.

The pumping or discharge of each section is timed so it coincides with the arrival of the laser pulse. For example, if the length of the system is 500 meters, the round trip of the pulse takes 3.3 micro-seconds. Therefore, by pumping each section, of the laser medium, every 3.3 micro-seconds and timing the pumping to coincide with the arrival of the laser pulse, each section of the laser gas medium may be used repeatedly, and the energy of the inverted population is added repeatedly. Considered in this way, the apparatus in its operation is quite analogous to a cyclotron where energy is added to the particle beam repeatedly at each acceleration gap, and consequently this apparatus may be referred to as a photon cyclotron.

In respect to further embodiments of the apparatus, when a carbon dioxide laser is operated as a photon cyclotron and gold reflectors are used, the laser pulse energy reached may be almost an order of magnitude higher than a single pass or conventionally operated carbon dioxide laser. The energy limit is set by the 4 percent loss on the gold mirrors, and the power density on the mirrors is not an operational limiting factor.

If, however, dielectric reflectors are used for mirrors, the losses are cut to about 0.1 percent per reflection. Then the power density on the mirror surfaces is critical and must be kept below $10^8$ watts per square centimeter. For a 1 micro-second long pulse and a surface area of $10^4$ square centimeters, which is equivalent to a surface area at the turn mirror of a 4 foot diameter pipe, the maximum energy obtainable is $10^6$ joules per pulse. To reach this level, every round trip in the photon cyclotron has to add about 4000 joules to the laser pulse. After about 500 round trips in the enclosed chamber in a 500 meter long overall apparatus, the limiting energy of $10^6$ joules is reached. In this apparatus or system embodiment there are about $10^{25}$ molecules at a $10^{-2}$ atmosphere and if ¼ percent of these are used 4000 joules may be added per round trip.

In respect to another embodiment, a photon cyclotron 150 meters long is made of 4 inch diameter glass tubing. The round trip of the laser light takes 1 microsecond. During the limited time, as necessary, an oscillator pulse may be introduced. Also a laser light beam pulse may be removed out of the apparatus or system in reference to these time sequences or intervals of 1 micro-second. The gas density or the discharge power may be adjusted so the 10 meter sections are kept below the super radiance length, there being about 30 discharge units, i.e., inverted populations or pumps. When carbon dioxide is used as the laser medium, the apparatus or system, in operating as a photon cyclotron, will operate at wave lengths of 10 microns. When xenon is used it will operate at wave lengths of 3.5 microns.

We claim:

1. A method for increasing the energy of laser pulses to very high levels, comprising:
   a. arranging a large chamber, the chamber having multiple internal reflecting means to guide a laser beam in a continuous path in the chamber until an escape energy level is reached, the chamber further having an escape exit means which remains closed until opened at an escape energy level of a working unit of a very high energy laser pulse;
   b. arranging multiple spaced laser pumps along the chamber and in communication with the laser beam in the continuous path in the chamber, each laser pump related to an inverted population of a laser energy source;
   c. arranging an excitation control system to trigger, in a selected sequence, the multiple spaced laser pumps arranged along the continuous path chamber;
   d. placing within the continuous path chamber a laser energy reacting medium; and
   e. supplying energy to the excitation control system to timely operate the laser pumps as their respective laser pulse is initiated and thereafter returns to its respective laser inverted population volume which adds a laser energy increment to compensate for reflective losses and to exceed the then occurring laser pulse level to increase the resulting laser pulse to be pumped at the follow on laser inverted population volume, and yet at all times, the laser reacting medium is kept at a level which is below super radiance.

2. Apparatus for increasing the energy of laser pulses to very high levels, comprising:
   a. means defining a large chamber, the chamber having multiple internal reflecting means to guide a laser beam in a continuous path until an escape energy level is reached, also having an escape exit means which remains closed until opened at an escape energy level of a working unit of a very high energy laser pulse; and containing a laser energy reacting medium;
   b. multiple spaced laser pumps mounted along the large chamber, each laser pump being positioned with respect to an inverted population of a laser energy source;
   c. an excitation control system connected to the multiple spaced laser pumps to trigger energy releases to them in a selected sequence so their respective laser pulse is first initiated, and thereafter upon its return, it is again given energy from this respective laser inverted population volume, so the added laser energy increment compensates for reflective losses and adds energy to exceed the then occurring laser pulse energy level to increase the resulting pulse energy to be pumped at the follow on inverted population volume, keeping at all times the laser energy reacting medium at a level which is below super radiance.

3. Apparatus for increasing the energy of laser pulses to very high levels, as claimed in claim 2, comprising in addition, an energy source for the excitation control systems.

4. Apparatus for increasing the energy of laser pulses to very high levels, as claimed in claim 2, wherein the escape exit means comprises a reflective material which will cease to reflect laser pulse energy when it reaches a preselected very high energy level and therefore allow the very high energy laser pulse to escape as a working unit.

5. Apparatus for increasing the energy of laser pulses to very high levels, as claimed in claim 4, having in addition, when the laser energy reacting medium is a gas, a mechanical valve means to close the large chamber immediately after the escape of the working unit of a very high energy laser pulse to prevent any continuing harm to the laser energy reacting gaseous medium.

6. Apparatus for increasing the energy of laser pulses to very high levels, as claimed in claim 2, when the laser energy reacting medium is a gas, wherein a feed mechanism supplies the multiple internal reflecting means which guide the laser beam in a continuous path, whereby, as said reflecting means are depleted, they are continuously replaced immediately following the reflection of a laser pulse, as the feed mechanism is operated.

7. Apparatus for increasing the energy of laser pulses to very high levels, as claimed in claim 6, wherein said multiple internal reflecting means comprise metallic strip materials and said feed mechanism supplies the strip materials as the feed mechanism is operated, the strip materials continuously being moved through the reflecting locations where their reflective properties are sufficiently destroyed upon the reflection of each laser pulse to require their replacement during the operation of this apparatus.

8. Apparatus for increasing the energy of laser pulses to very high levels, as claimed in claim 7, wherein said feed mechanism comprises powered rollers for moving said metallic strip materials into and out of their reflecting locations.

9. Apparatus for increasing the energy of laser pulses to very high levels, as claimed in claim 7, wherein the metallic strip comprises a discrete length of reflective material which terminates during operation of the feed mechanism to thereby open the exit and permit the escape of the working unit of the very high energy laser pulse.

10. Apparatus for increasing the energy of laser pulses to very high levels, as claimed in claim 2, wherein the large chamber comprises two long pipes connected together at their ends by glass prisms and the laser energy reacting medium in the two long pipes is a gas.

11. Apparatus for increasing the energy of laser pulses to very high levels, as claimed in claim 2, wherein the large chamber comprises four pipes arranged in perpendicular pairs, two being longer and parallel, and two being shorter and parallel, and incorporating mirrors in effective corner locations, one of said mirrors serving as an exit when a very high energy laser pulse is created causing its destruction, and the laser energy reacting medium in the four pipes is a gas.

12. Apparatus for increasing the energy of laser pulses to very high levels, as claimed in claim 11, having in addition, a mechanical valve means to close the chamber immediately after the escape of the working unit of a very high energy laser pulse by destroying the mirror located at one of the corner locations.

13. Apparatus for increasing the energy of laser pulses to very high levels, as claimed in claim 12, wherein the conner mirrors are four in number and one mirror of the four is thinner than the others to be the one to be destroyed allowing the escape of the working unit of a very high energy laser pulse.

14. Apparatus for increasing the energy of laser pulses to very high levels, as claimed in claim 10, and further comprising an outside laser oscillator and a piezoelectric crystal decoupler, said decoupler being situated adjacent one of the glass prisms in said chamber, whereby a pulse of laser energy may be introduced into said chamber to start said apparatus by changing the gap distance between a face of said decoupler and a face of said prism to optically couple said decoupler to said prism.

15. Apparatus for increasing the energy of laser pulses to very high levels, as claimed in claim 14, wherein a second piezoelectric crystal decoupler is situated adjacent a second one of said glass prisms to extract a working unit of a very high energy laser pulse when said second decoupler is moved to decrease the gap distance between a face of said second decoupler and a face of said second prism to thereby optically couple said second decoupler to said second prism.

16. Apparatus for increasing the energy of laser pulses to very high levels, as claimed in claim 2, wherein the spaced laser pumps are flash tube units.

17. Apparatus for increasing the energy of laser pulses to very high levels, as claimed in claim 2, wherein the spaced laser pumps are gas discharge units.

18. Apparatus for increasing the energy of laser pulses to very high levels, as claimed in claim 2, wherein the spaced laser pumps are radio frequency discharge units.

19. Apparatus for increasing the energy of laser pulses to very high levels, as claimed in claim 2, wherein the spaced laser pumps are microwave units.

20. Apparatus for increasing the energy of laser pulses to very high levels, as claimed in claim 2, wherein the spaced laser pumps are pressure changing units.

21. Apparatus for increasing the energy of laser pulses to very high levels, as claimed in claim 2, wherein said first means defines a rectangular chamber having an axis which circumscribes a rectangular configuration to provide a continuous path for the laser beam.

22. Apparatus for increasing the energy of laser pulses to very high levels, as claimed in claim 2, wherein said first means defines a triangular chamber having an axis which circumscribes a triangular configuration to provide a continuous path for the laser beam.

23. Apparatus for increasing the energy of laser pulses to very high levels, as claimed in claim 2, comprising in addition, an outside laser for introducing a laser pulse into the laser energy reacting medium in said chamber to start said apparatus.

24. Apparatus for increasing the energy of laser pulses to very high levels, as claimed in claim 2 wherein the large chamber is a polygon in which the continuous path for the laser beam is provided.

25. Apparatus for increasing the energy of laser pulses to very high levels, as claimed in claim 2, wherein the spaced laser pumps are gas dynamic units.

26. Apparatus for increasing the energy of laser pulses to very high levels, as claimed in claim 2, wherein the spaced laser pumps are outside pumping lasers.

27. Apparatus for increasing the energy of laser pulses to very high levels, as claimed in claim 2, including an inside mirror in the chamber to redirect an incoming starting laser pulse along the optical axis of said chamber the inside mirror including an electrical energy means to destroy this inside mirror immediately after the pulse is redirected and thereby clear the path for the laser beam within the chamber.

28. Apparatus for increasing the energy level of a laser pulse comprising:
means defining a chamber;
a laser medium enclosed in the chamber;
a plurality of laser pumping sections operable to intermittently pump the laser medium in the chamber adjacent each laser pumping section;
an excitation control system to trigger, in a selected sequence, the laser pumping sections;
means for introducing a laser pulse in the chamber; and
means for selectively triggering the pumping sections so as to increase the energy level of the laser pulse.

29. A method for increasing the energy level of laser pulses comprising the steps of:
placing reflecting means with a polygonal-shaped chamber so as to guide a laser beam in a continuous path through the chamber;
confining a laser medium within the chamber;
spacing laser pumps along the chamber so as to pump the laser medium therein;
interconnecting each laser pump with an excitation control system to trigger the laser pumps in a selected sequence;
initiating a pulse of laser radiation in the chamber; and
selectively exciting the laser medium in the chamber with the laser pumps so as to increase the energy level of the laser pulse.

* * * * *